(12) United States Patent
Bressler et al.

(10) Patent No.: US 11,338,455 B1
(45) Date of Patent: May 24, 2022

(54) ADAPTIVE DRESS PACK MANAGER FOR ROBOTIC ARM

(71) Applicant: Southwest Research Institute, San Antonio, TX (US)

(72) Inventors: Cody Eli Bressler, San Antonio, TX (US); Cody Michael Porter, Helotes, TX (US); Branson Patrick Brockschmidt, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 0 days.

(21) Appl. No.: 17/209,637

(22) Filed: Mar. 23, 2021

(51) Int. Cl.
  *B25J 9/12* (2006.01)
  *B25J 19/00* (2006.01)
  *B25J 9/10* (2006.01)
  *B25J 13/08* (2006.01)
  *B25J 9/16* (2006.01)

(52) U.S. Cl.
  CPC ........... *B25J 19/0029* (2013.01); *B25J 9/102* (2013.01); *B25J 9/126* (2013.01); *B25J 9/1633* (2013.01); *B25J 9/1674* (2013.01); *B25J 13/085* (2013.01)

(58) Field of Classification Search
  CPC .. B66C 13/12; F16L 3/00; H02G 11/00; B25J 9/102; B25J 9/126; B25J 9/1633; B25J 9/1674; B25J 19/0025; B25J 19/0029; B25J 13/085; B25J 9/0027; B65H 2404/16; B65H 2404/147; B65H 2404/1452; B65H 2404/1451; B65H 2404/1441; B65H 2404/144; B65H 2404/143; B65H 2404/14; B65H 5/06; B65H 2515/704; B65H 2515/34; B65H 2515/32; B65H 2515/31; B65H 23/198; B65H 23/1955; B65H 23/185; B65H 23/1806; B65H 23/1825; B65H 23/192; H02P 7/00; F16H 19/0645; F16H 19/0672
  USPC ...... 74/490.02; 271/272, 273, 274; 414/918; 901/49; 242/390.9, 390.8, 390.6, 390, 242/366.4, 364, 365.7, 394, 395; 174/69; 248/51, 52
  See application file for complete search history.

(56) References Cited

U.S. PATENT DOCUMENTS

| | | | | |
|---|---|---|---|---|
| 4,565,334 A | * | 1/1986 | Ruhl | B65H 23/1955 242/413.3 |
| 6,431,018 B1 | * | 8/2002 | Okada | B25J 19/0025 74/490.02 |
| 7,942,382 B2 | * | 5/2011 | Lecoq | H02G 1/086 254/134.3 R |
| 9,289,902 B2 | * | 3/2016 | Groß | A61B 6/4458 |
| 10,989,282 B1 | * | 4/2021 | Hoffman | F16H 19/0672 |
| 2001/0032973 A1 | * | 10/2001 | Karlinger | B25J 19/0025 254/394 |
| 2002/0063541 A1 | * | 5/2002 | Cote | G01L 5/0085 318/432 |

(Continued)

*Primary Examiner* — Jake Cook
*Assistant Examiner* — T. Scott Fix
(74) *Attorney, Agent, or Firm* — Livingston Law Firm

(57) ABSTRACT

A dress pack manager for use with a robotic arm having an end-of-arm tool supplied with power or working fluid via a dress pack. A pair of rollers are spaced apart such that the dress pack may pass between them, and such that rotation of the rollers applies friction to the dress pack and causes the dress pack to move. An electric motor rotates one of the rollers in both a forward and backward rotation and is torque-controlled to maintain a constant tension applied to the dress pack by the rollers.

10 Claims, 4 Drawing Sheets

(56) References Cited

U.S. PATENT DOCUMENTS

| | | | |
|---|---|---|---|
| 2008/0056859 A1* | 3/2008 | Inoue | B25J 19/0029 901/30 |
| 2014/0239113 A1* | 8/2014 | Igarashi | B65H 23/1888 242/420.5 |
| 2017/0259432 A1* | 9/2017 | Goerbing | B41J 2/175 |
| 2019/0193975 A1* | 6/2019 | Hamano | B65H 23/18 |

* cited by examiner

ADAPTIVE DRESS PACK MANAGER FOR ROBOTIC ARM

TECHNICAL FIELD OF THE INVENTION

This invention relates to robotics, and more particularly to managing dress packs for robotic arms.

BACKGROUND OF THE INVENTION

Cables and hoses are integral parts of most industrial robot arms. Cables carry electricity to end-of-arm-tooling. Hoses and airlines can carry coolant, oil, air, gasses, or many other kinds of fluids. These cables and hoses are referred to as the robotic "dressing".

Industrial manufacturers that use robots use cable "dress packages" or "dress packs" to facilitate the use of cables and hoses feeding industrial robot arms. These dress packages provide an organized way of covering and protecting cables and hoses from sparks, pollutants, and other environmental hazards. Instead of cables and other accessories hanging from the robot arm in an unorganized fashion, an outer covering called an umbilical protects them. Sometimes spring-loaded mechanisms or are added to help feed the covered dressing.

Any industrial application that uses cables, hoses, and other accessories that usually hang onto the robot arm will typically benefit with use of a dress package, including arc welding, spot welding, material handling, palletizing, and many other industrial applications.

Conventional dress packs are limited in their use with robotic systems having high degree of freedom movement. Often, this problem is overcome by imposing software limits on the range motion of a robotic arm, thereby degrading system performance.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

The following description is directed to a dress pack manager for a robotic arm. The dress pack manager provides improved management of robotic cables and hoses for interference-free operation on robotic systems. Its active cable and hose management increases the capability and reliability of robotic automated systems. The dress pack manager is "adaptive" in the sense that it adapts to the tension or slack needed by an end-of-arm tool. It provides an improved alternative to conventional passive dress pack feed systems such as spring-loaded mechanisms or spools.

Figure 1:
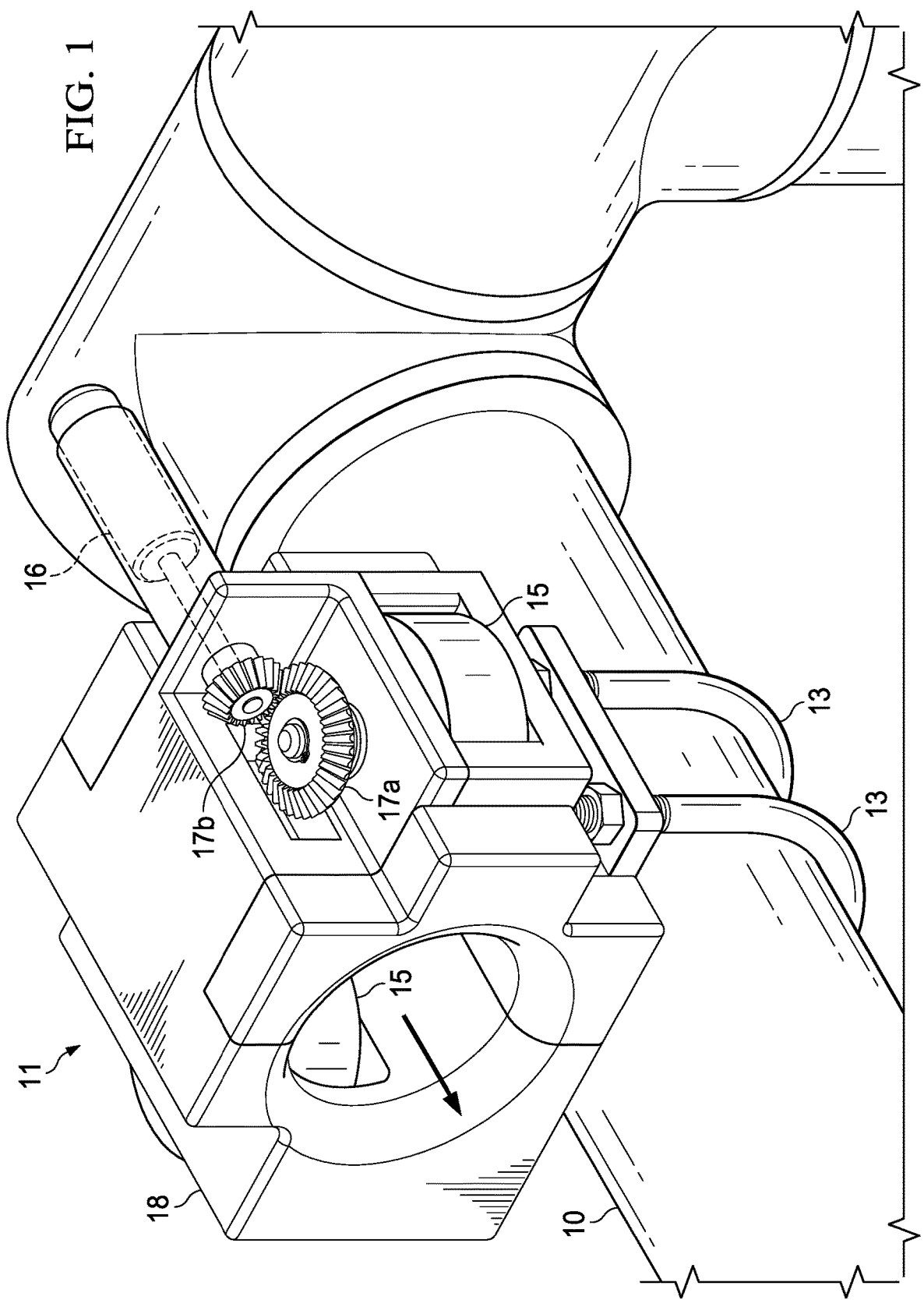
FIG. 1 is a perspective view of the dress pack manager mounted on a robotic arm.

FIG. 1 illustrates a robotic arm 10 equipped with a dress pack manager 11 in accordance with the invention. At least one cable or hose (not shown), typically covered with an umbilical, extends from the dress pack 11 as indicated by the arrow. The cable(s) and/or hose(s), e.g., the dress pack, serve tooling at the end of the robot arm. As used herein, dressing and dress pack refer to one or more cables and/or hoses having a covering such that a generally cylindrical umbilical is formed.

The dress pack manager 11 is securely and usually removably attached to the robot arm 10. In the example of FIG. 1, this attachment is by means of clamps 13, but many other attachment means are possible.

The working elements of dress pack manager 11 visible in FIG. 1 are a pair of rollers 15 and gears 17a and 17b. These and other elements are discussed below.

An outer housing 18 has a channel through which the dress pack passes. Outer housing 18 houses the rollers 15, gears 17a and 17b, and an electric motor 16 for driving the rollers 15.

Robotic arm 10 is assumed to be part of a high degree of freedom robotic system having some sort of tool at the working end. The dressing must travel from the tool to an origin point such as a computer or power source. As the robotic arm moves, the dressing must remain connected to both the origin point and the tool. During motion, if the dressing is pulled too tightly, connections or cables can be damaged, or the motion drives can be strained. On the other hand, if the dressing is too slack, excess length risks entanglement with system components or the workpiece.

As explained below, dress pack manager 11 provides an adaptive tension that overcomes too-tight and too-slack issues. The dress pack manager 11 provides a length for the dress pack with a proper amount of slack despite a variety of positions of arm 10.

Dress pack manager 11 is located sufficiently far from the workpiece so as to not add bulk to the tool at the end of arm 10.

Figure 2:
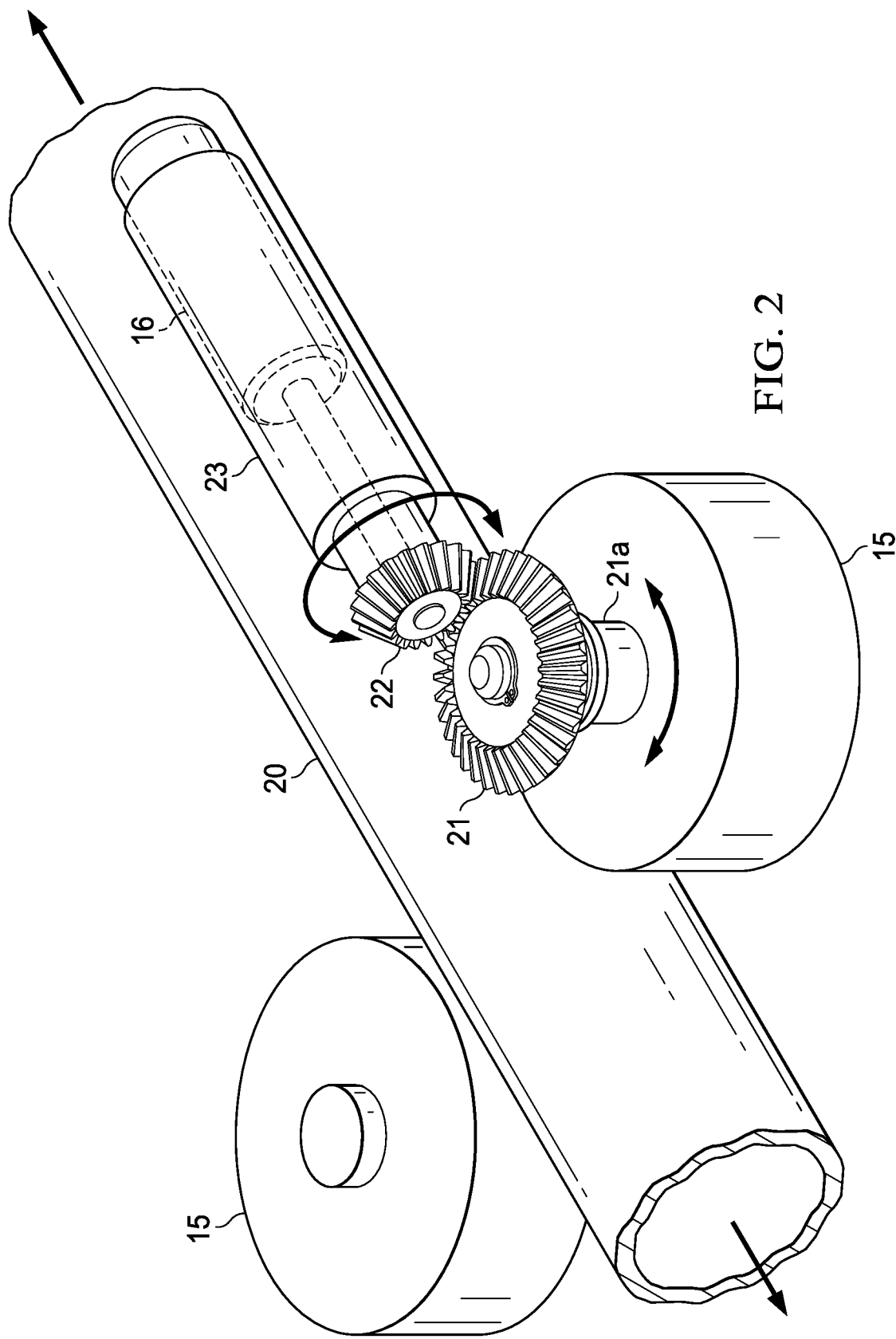
FIG. 2 schematically illustrates the active elements of the dress pack manager.

FIG. 2 schematically illustrates the working elements of dress pack manager 11. The outer housing 18 is not shown.

The dressing 20 passes between the two rollers 15. The spacing between the rollers is such that friction applied to the dressing 20 by rollers 15 as they rotate causes the dressing 20 to move. Thus, the distance between the rollers 15 is approximately the diameter of dressing 20. Although not shown, various mechanisms can be optionally added to make this distance adjustable and maintainable. For example, one roller 15 could be mounted on a spring-type mechanism.

One roller 15 is a drive roller, and the other roller 15 is an idler. Rollers 15 move in both directions—backward to move the dressing 20 toward the source or forward to move the dressing 20 toward the tool.

Electric motor 16 is contained within tube 23 and causes a first (vertical) gear 22 to rotate. Vertical gear 22 is interconnected with gear teeth to horizontal gear 21. Thus, as gear 22 rotates vertically, gear 21 rotates horizontally. Gear 21 is above the center axis of drive roller 15 and is connected to the center axis by means of a drive shaft 21a. As gears 22 and 23 rotate, roller 15 also rotates. Friction applied to the dressing 20 causes dressing 20 to move backward or forward as roller 15 rotates. This same friction also causes the other (idler) roller 15 to rotate.

A feature of the invention is that motor 16 provides the same amount of tension on dressing 20 at all points in its range of travel. The range of motion outward toward the tool is not limited as it would be in the case of a spring or spool.

To this end, motor 16 is a torque-controlled motor. As dressing 20 gets tighter, the holding torque of motor 16 increases. Once the torque passes a certain threshold, motor 16 spools out more slack. When the holding torque decreases, because there is slack hanging, motor 16 reels in dressing 20 until it tightens again.

Motor 16 is a gear-type motor, but with its torque monitored and controlled by monitoring and controlling current. This may be compared to other motors that are controlled with position or speed control.

Referring again to FIG. 1, housing 18 substantially contains rollers 15 and provides a guiding aperture for dress pack on one or both sides of rollers 15. However, various other housing configurations could be used, with the common feature being that housing 18 provides a stable base for attaching rollers 15 and motor 16 and for attaching dress pack manager 11 to the roller arm.

Figure 3:
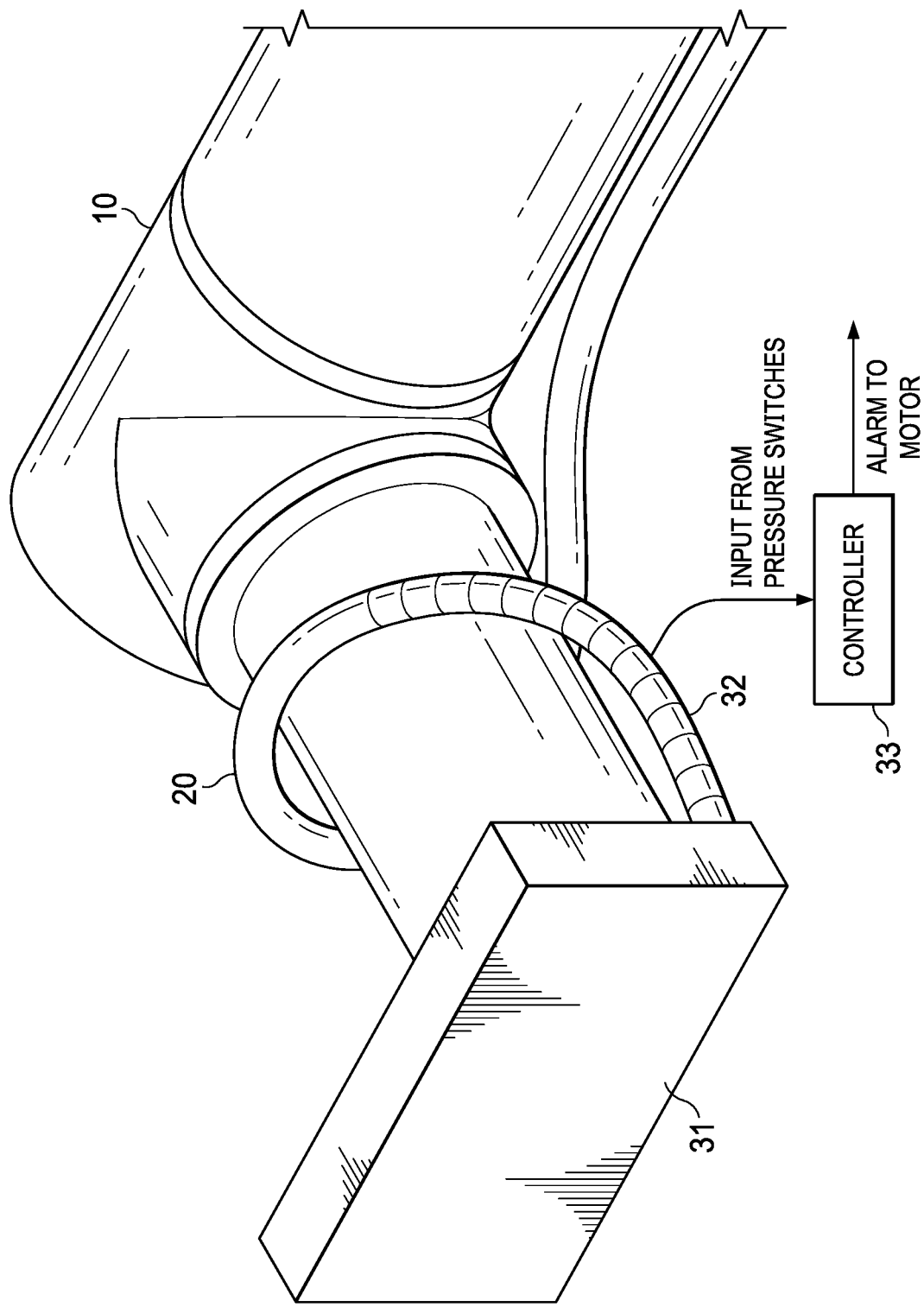
FIG. 3 illustrates an overload protection feature of the dress pack manager.

FIG. 3 illustrates a safety feature that prevents over-tensioning of the dress pack and/or motor overload. The last portion of dress pack 20, where it attaches to end of arm tool 31 is equipped with pressure sensitive switches 32. A controller 33 monitors these switches.

In FIG. 3, dress pack 20 has inadvertently become wrapped around a portion of the tool 31. This has resulted in excess tension, which is detected by the pressure switches 32. This information is communicated to controller 33, which signals the motor 16 to move in a direction that will pay out more slack to the dress pack.

Figure 4:
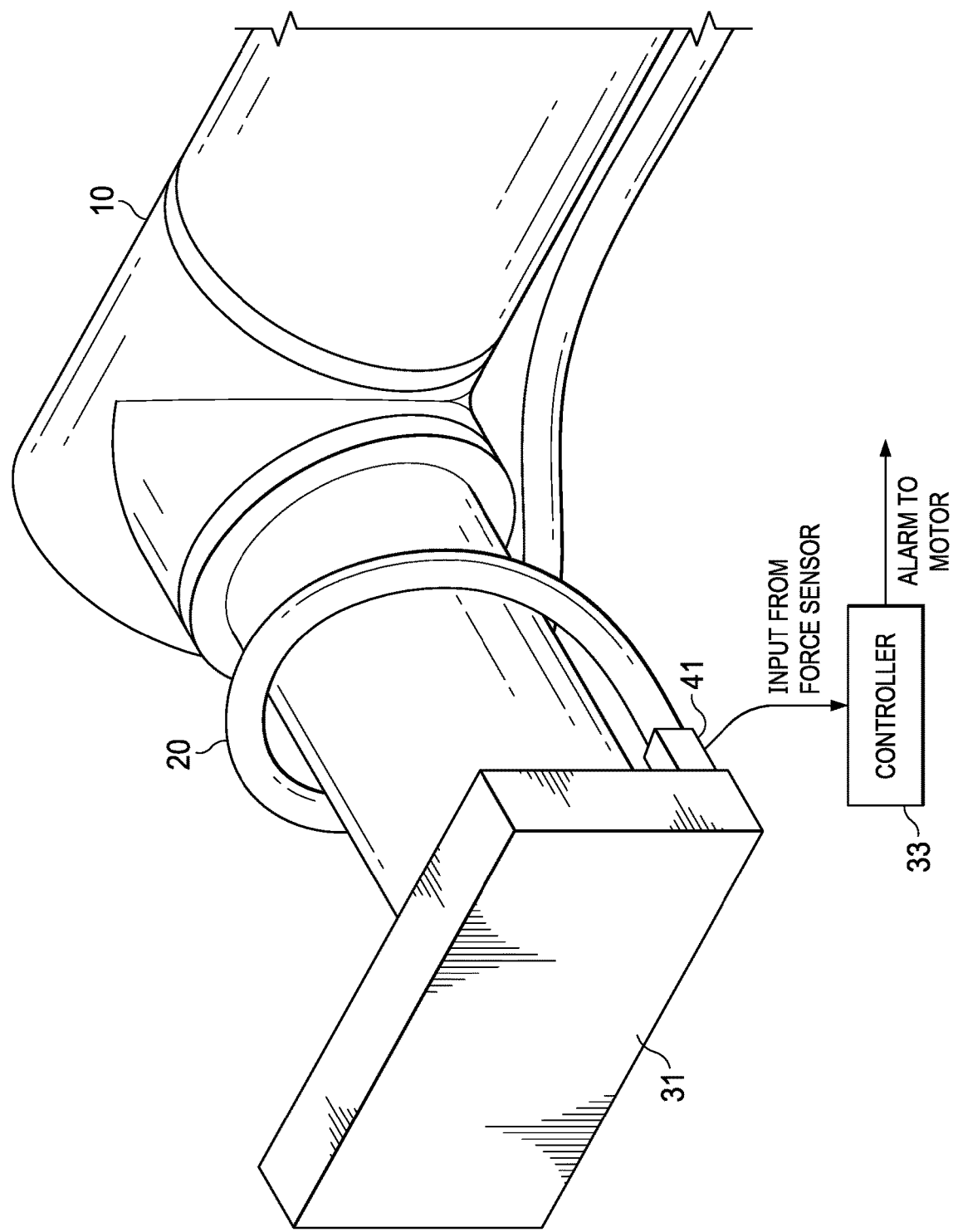
FIG. 4 illustrates an alternative embodiment of the overload protection feature.

FIG. 4 illustrates an alternative embodiment of a safety feature that prevents over-tensioning of the dress pack and/or motor overload. In FIG. 4, a force sensor 41 is installed at a strain relief point where dress pack 20 connects to the tool 31. If dress pack 20 becomes overtightened, this condition is sensed by sensor 41 and communicated to controller 33.

What is claimed is:

1. A dress pack manager for use with a robotic arm having an end-of-arm tool supplied with power or working fluid via a dress pack, comprising:
   a pair of rollers, spaced apart such that the dress pack may pass between them;
   wherein the rollers are spaced such that rotation of the rollers applies friction to the dress pack and causes the dress pack to move;
   a gear-driven electric motor operable to rotate at least one of the rollers in both a forward and backward rotation, the at least one roller thereby being an active roller;
   wherein the electric motor is torque-controlled by monitoring and controlling the current supplied to the motor, such that the tension applied to the dress pack remains constant; and
   a housing for providing an attachment base for the rollers and motor and to the robotic arm.

2. The dress pack manager of claim 1, wherein the housing has at least one guiding aperture for the dress pack before or after the dress pack passes through the rollers.

3. The dress pack manager of claim 1, wherein the motor rotates a vertical gear, which rotates a horizontal gear above the active roller, which thereby rotates the active roller.

4. The dress pack manager of claim 1, further comprising at least one pressure switch attached to the dress pack and a controller that detects an overtension condition of the dress pack and delivers a signal to the motor to provide less tension to the dress pack.

5. The dress pack manager of claim 1, further comprising a force sensor installed between the dress pack and the end-of-arm tool that detects an overtension condition of the dress pack and delivers a signal to the motor to provide less tension to the dress pack.

6. A method of managing a dress pack for a robotic arm having an end-of-arm tool supplied with power or working fluid via a the dress pack, comprising:
   providing a pair of rollers, spaced apart such that the dress pack may pass between them;
   wherein the rollers are spaced such that rotation of the rollers applies friction to the dress pack and causes the dress pack to move;
   operating one roller with a gear-driven electric motor operable to rotate the active roller in both a forward and backward rotation;
   wherein the electric motor is torque-controlled by monitoring and controlling the current supplied to the motor, such that the tension applied to the dress pack remains constant; and
   providing a platform for the rollers and motor; and
   attaching the platform to the robotic arm.

7. The method of claim 6, wherein the housing has at least one guiding aperture for the dress pack before or after the dress pack passes through the rollers.

8. The method of claim 6, wherein the motor rotates a vertical gear, which rotates a horizontal gear above the active roller, which thereby rotates the active roller.

9. The method of claim 6, further comprising providing at least one pressure switch attached to the dress pack and a controller that detects an overtension condition of the dress pack and delivers a signal to the motor to provide less tension to the dress pack.

10. The method of claim 6, further comprising providing a force sensor installed between the dress pack and the end-of-arm tool that detects an overtension condition of the dress pack and delivers a signal to the motor to provide less tension to the dress pack.

* * * * *